United States Patent
Moragne et al.

(10) Patent No.: US 11,206,841 B2
(45) Date of Patent: Dec. 28, 2021

(54) YOGURT PRODUCT FROM HIGH STARCH FRUITS

(71) Applicant: International Agriculture Group, LLC, Mooresville, NC (US)

(72) Inventors: Maurice Moragne, Mooresville, NC (US); Humberto Wedderburn Morales, Panama (PA); David H. Skea, Independence, KY (US); Julio Cesar Vasquez, Fairburn, GA (US)

(73) Assignee: International Agriculture Group, LLC, Mooresville, NC (US)

( * ) Notice: Subject to any disclaimer, the term of this patent is extended or adjusted under 35 U.S.C. 154(b) by 136 days.

(21) Appl. No.: 15/699,842

(22) Filed: Sep. 8, 2017

(65) Prior Publication Data
US 2018/0070602 A1 Mar. 15, 2018

Related U.S. Application Data

(60) Provisional application No. 62/385,954, filed on Sep. 9, 2016.

(51) Int. Cl.
| | |
|---|---|
| *A23C 9/133* | (2006.01) |
| *A23L 29/30* | (2016.01) |
| *A23L 19/00* | (2016.01) |
| *A23C 11/10* | (2021.01) |
| *A23L 29/225* | (2016.01) |
| *A23L 33/10* | (2016.01) |
| *A23K 40/10* | (2016.05) |
| *B02B 3/14* | (2006.01) |

(52) U.S. Cl.
CPC .............. *A23C 9/133* (2013.01); *A23C 11/10* (2013.01); *A23K 40/10* (2016.05); *A23L 19/00* (2016.08); *A23L 19/09* (2016.08); *A23L 29/225* (2016.08); *A23L 29/35* (2016.08); *A23L 33/10* (2016.08); *B02B 3/14* (2013.01)

(58) Field of Classification Search
CPC ...................................................... A23C 9/133
See application file for complete search history.

(56) References Cited

U.S. PATENT DOCUMENTS

| | | |
|---|---|---|
| 620,209 A | 2/1899 | Zürcher |
| 800,683 A | 10/1905 | Romerogarcia |
| 856,479 A | 6/1907 | Lewis |

(Continued)

FOREIGN PATENT DOCUMENTS

| | | |
|---|---|---|
| CN | 1864553 A | 11/2006 |
| CN | 101253964 A | 9/2008 |

(Continued)

OTHER PUBLICATIONS

Machine translation of CN102415444 to Yang, et al. Publication date Apr. 18, 2012. pp. 1-5. (Year: 2012).*

(Continued)

*Primary Examiner* — Jenna A Watts
(74) *Attorney, Agent, or Firm* — Crowell & Moring LLP

(57) ABSTRACT

The present invention relates to a method for making and the composition of a non-dairy yogurt made from green banana flour, without the use of milk or soy products. The non-dairy yogurt has improved taste, texture and sensory characteristics compared to commercial non-dairy yogurts currently on the market.

19 Claims, 1 Drawing Sheet

(56) References Cited

U.S. PATENT DOCUMENTS

| | | | |
|---|---|---|---|
| 857,445 | A | 6/1907 | Clarke |
| 1,564,508 | A | 12/1925 | Bauermeister |
| 1,609,993 | A | 12/1926 | Dickerson |
| 1,959,301 | A | 5/1934 | Northcutt et al. |
| 2,020,257 | A | 11/1935 | Dickinson |
| 3,103,439 | A | 9/1963 | Williams |
| 3,134,683 | A | 5/1964 | Holahan et al. |
| 3,222,183 | A | 12/1965 | Rozsa et al. |
| 3,259,508 | A | 7/1966 | Aguirre et al. |
| 3,393,074 | A | 7/1968 | Ehrlich |
| 3,490,355 | A | 1/1970 | Groth et al. |
| 3,544,337 | A | 12/1970 | Bundus |
| 3,573,937 | A | 4/1971 | Sarna |
| 3,663,718 | A | 5/1972 | Bundus |
| 3,795,744 | A | 3/1974 | Ogawa et al. |
| 3,810,996 | A | 5/1974 | Sutliff et al. |
| 3,843,808 | A | 10/1974 | Ziccarelli |
| 4,038,433 | A | 7/1977 | Manser et al. |
| 4,104,958 | A | 8/1978 | Manser et al. |
| 4,242,365 | A | 12/1980 | Numata et al. |
| 4,465,696 | A | 8/1984 | Strahl |
| 4,784,871 | A | 11/1988 | Park |
| 4,849,216 | A | 7/1989 | Andersen |
| 4,886,669 | A | 12/1989 | Ventouras |
| 4,935,254 | A | 6/1990 | Nunez |
| 4,986,986 | A | 1/1991 | Roth |
| 5,246,702 | A | 9/1993 | Vecchi |
| 5,576,001 | A | 11/1996 | Abu-Shaaban |
| 5,631,032 | A | 5/1997 | Gil et al. |
| 5,676,993 | A | 10/1997 | Watterson et al. |
| 5,738,887 | A | 4/1998 | Wu |
| 5,919,513 | A | 7/1999 | Kaczmarczyk |
| 5,972,399 | A | 10/1999 | Lapré et al. |
| 6,017,571 | A | 1/2000 | Cross et al. |
| 6,442,866 | B2 | 9/2002 | Wefers |
| 6,485,773 | B1 | 11/2002 | Myers et al. |
| 6,620,440 | B1 | 9/2003 | Hsia et al. |
| 6,676,933 | B2 | 1/2004 | Vergez et al. |
| 7,033,976 | B2 | 4/2006 | Guzman |
| 7,314,644 | B2 | 1/2008 | Kwak et al. |
| 7,423,106 | B2 | 9/2008 | Doane et al. |
| 7,425,595 | B2 | 9/2008 | Savich et al. |
| 7,591,974 | B2 | 9/2009 | Savich et al. |
| 7,607,259 | B2 | 10/2009 | Savich |
| 7,651,705 | B2 | 1/2010 | Rao et al. |
| 7,871,657 | B2 | 1/2011 | Nagappa et al. |
| 7,918,929 | B2 | 4/2011 | Sunnucks |
| 8,017,147 | B2 | 9/2011 | Mazed et al. |
| 8,017,553 | B2 | 9/2011 | Doane et al. |
| 8,128,955 | B2 | 3/2012 | Howard et al. |
| 8,192,784 | B2 | 6/2012 | Anand et al. |
| 8,241,696 | B2 | 8/2012 | Chung et al. |
| 8,257,694 | B2 | 9/2012 | Daikeler et al. |
| 8,945,639 | B2 | 2/2015 | Rhodes |
| 2004/0013772 | A1 | 1/2004 | Weiss et al. |
| 2004/0133941 | A1 | 7/2004 | Bowen et al. |
| 2005/0100645 | A1* | 5/2005 | Baensch ............... A23L 25/40 426/482 |
| 2006/0188631 | A1 | 8/2006 | Woo et al. |
| 2006/0198937 | A1 | 9/2006 | Jarrett |
| 2006/0210692 | A1 | 9/2006 | Mower |
| 2007/0020373 | A1 | 1/2007 | Maury |
| 2007/0122529 | A1 | 5/2007 | Thai et al. |
| 2007/0286934 | A1 | 12/2007 | Schallhorn |
| 2008/0050498 | A1 | 2/2008 | Sherwood et al. |
| 2008/0187642 | A1 | 8/2008 | Ekanayake et al. |
| 2008/0206424 | A1 | 8/2008 | Villagran |
| 2008/0213412 | A1 | 9/2008 | Yamada |
| 2008/0226566 | A1 | 9/2008 | Poth et al. |
| 2008/0241288 | A1 | 10/2008 | Thompson |
| 2008/0260924 | A1 | 10/2008 | Chen et al. |
| 2009/0019905 | A1 | 1/2009 | Savich et al. |
| 2009/0022853 | A1 | 1/2009 | Ten Brink et al. |
| 2009/0042169 | A1 | 2/2009 | Kintrup et al. |
| 2009/0087517 | A1 | 4/2009 | Freestone et al. |
| 2009/0087519 | A1 | 4/2009 | Hundscheid et al. |
| 2009/0136642 | A1 | 5/2009 | Singh-Meneghini |
| 2009/0208607 | A1 | 8/2009 | Bunke et al. |
| 2009/0324761 | A1 | 12/2009 | Khoo et al. |
| 2010/0233128 | A1 | 6/2010 | Panasenko |
| 2010/0166888 | A1 | 7/2010 | Luber et al. |
| 2010/0189767 | A1 | 7/2010 | Shimoni et al. |
| 2010/0189843 | A1 | 7/2010 | Xie et al. |
| 2011/0104335 | A1 | 5/2011 | Rumbaut et al. |
| 2011/0262612 | A1 | 10/2011 | Götz et al. |
| 2012/0165289 | A1 | 6/2012 | Rhodes et al. |
| 2012/0180964 | A1 | 7/2012 | Heinricher |
| 2012/0189751 | A1 | 7/2012 | Beinecke et al. |
| 2013/0156893 | A1 | 6/2013 | Han |
| 2013/0310457 | A1 | 11/2013 | Ramesh |
| 2013/0330444 | A1 | 12/2013 | Barbosa Senra Lopes et al. |
| 2015/0050415 | A1 | 2/2015 | Oviasu |
| 2015/0080297 | A1 | 3/2015 | Goedhart et al. |
| 2015/0093776 | A1 | 4/2015 | Yoon et al. |
| 2015/0140163 | A1 | 5/2015 | Deckard et al. |
| 2015/0189901 | A1 | 7/2015 | Baker |
| 2015/0216918 | A1 | 8/2015 | Nair |
| 2015/0250203 | A1 | 9/2015 | Edwards et al. |
| 2015/0366248 | A1 | 12/2015 | Yang |
| 2016/0037811 | A1 | 2/2016 | Xiao et al. |
| 2016/0106125 | A1 | 4/2016 | Rascon |
| 2018/0125107 | A1 | 5/2018 | Moragne et al. |

FOREIGN PATENT DOCUMENTS

| | | | | |
|---|---|---|---|---|
| CN | 102415444 A | | 4/2012 | |
| CN | 106916862 A | | 7/2017 | |
| JP | 20009153419 A | * | 7/2009 | ............. A23L 1/212 |
| WO | 97/26889 A1 | | 7/1997 | |
| WO | 99/53777 A1 | | 10/1999 | |
| WO | 2007/099506 A1 | | 9/2007 | |
| WO | 2007/137198 A1 | | 11/2007 | |
| WO | 2008/032888 A1 | | 3/2008 | |
| WO | 2013/016198 A1 | | 1/2013 | |
| WO | 2013/078379 A2 | | 5/2013 | |
| WO | 2013/129712 A1 | | 9/2013 | |
| WO | WO-2014099707 A2 | * | 6/2014 | ................ C12P 7/52 |
| WO | 2014/102835 A1 | | 7/2014 | |
| WO | 2014/167372 A2 | | 10/2014 | |
| WO | 2015/023935 A2 | | 2/2015 | |
| WO | 2015/148523 A1 | | 10/2015 | |
| WO | 2016/070017 A1 | | 5/2016 | |
| WO | 2016/081012 A1 | | 5/2016 | |
| WO | 2016/096232 A1 | | 6/2016 | |
| WO | 2016/156426 A1 | | 10/2016 | |

OTHER PUBLICATIONS

Peroni-Okita, et al. "The cold storage of green bananas affects the starch degradation during ripening at higher temperature". Carbohydrate Polymers, 96, (2013), 137-147. (Year: 2013).*

Sharar. "Lactic acid fermentation of pasteurized and powdered milk and optimizing the factors affecting the fermentation process". Brae University, Dec. 2013. pp. 1-71. (Year: 2013).*

Machine translation of JP20009153419 to Kato, publication date: Jul. 2009. pp. 1-14. (Year: 2009).*

International Search Report and Written Opinion for Application No. PCT/US2018/022232 dated Jan. 30, 2019.

International Search Report and Written Opinion for Application No. PCT/US2017/050786 dated Jan. 30, 2018.

"Browned Flour". Southern Living Magazine. Available online as of Jan. 2013. p. 1. (Year: 2013).

"How and why to Toast Flour". Bon Appetit. Available online as of May 6, 2011. pp. 1-4. (Year: 2011).

Oluwalana, et al. "Proximate composition, rheological and sensory qualities of plantain flour blanched under three temperature regimes". Available online as of Nov. 2011. African Journal of Food Science, vol. 5 (14), pp. 769-774. (Year: 2011).

Piggot. et al. "Understanding Natural Flavors". 1994 edition. Springer Science Publisher. pp. 1-19. (Year: 1994).

(56) References Cited

OTHER PUBLICATIONS

Ideas in Food. "Toasted Flour". Available online from blog.ideasinfood.com, as of Jul. 26, 2015. pp. 1-4. (Year: 2015).
Adegboyega. Chemical Composition of Unripe and Ripe Plantain. J. Sci. Fd Agric. 1973, 24, 703-707. (Year: 1973).
Patent Cooperation Treaty International Searching Authority, The International Search Report and Written Opinion for application No. PCT/US2017/050793, dated Dec. 26, 2017, 13 pages.
European Search Report dated Apr. 17, 2020 in EP Patent Application No. 17849663.4, 9 pages.

\* cited by examiner

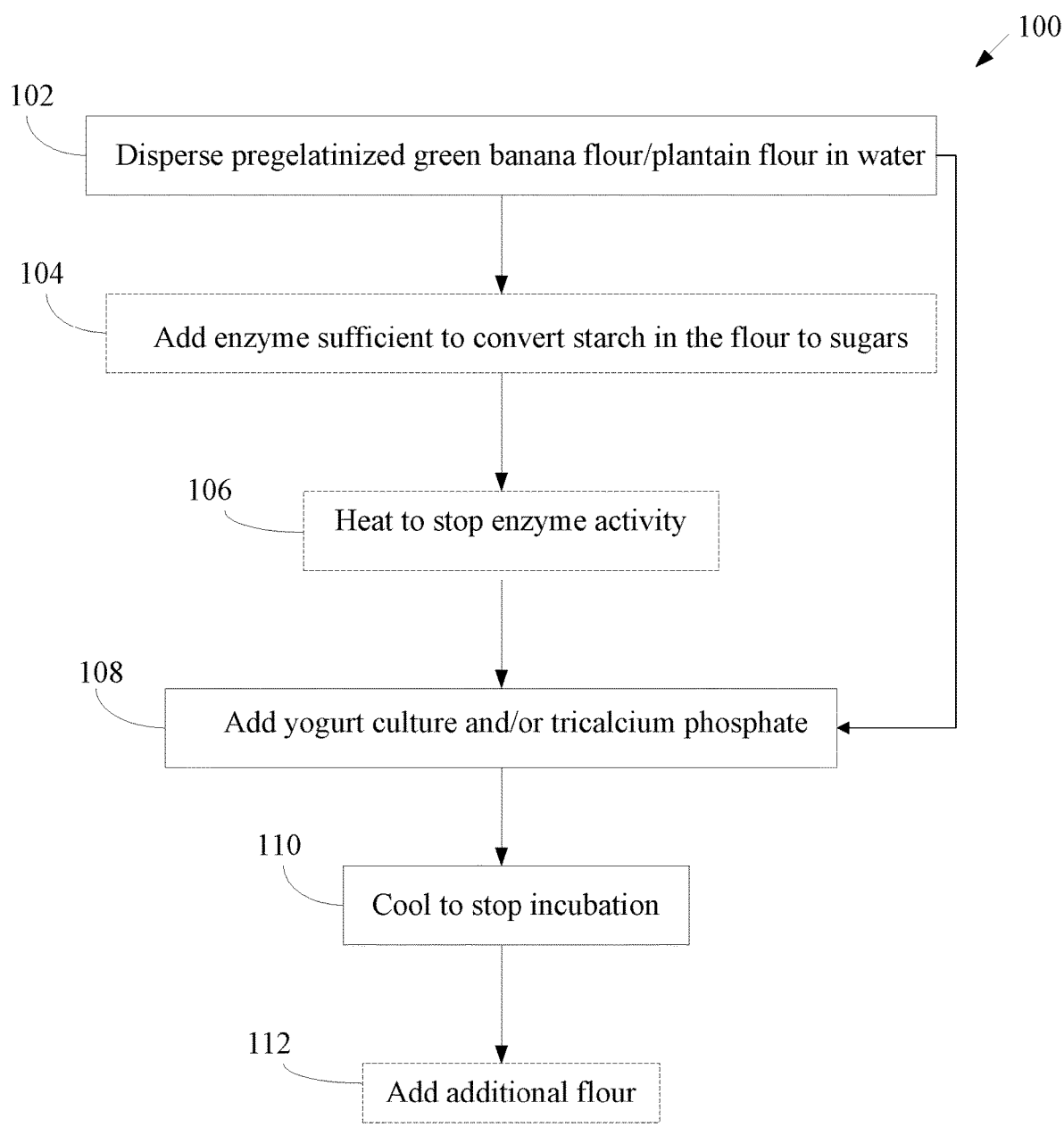

YOGURT PRODUCT FROM HIGH STARCH FRUITS

CROSS-REFERENCE TO RELATED APPLICATION

This application claims priority to U.S. Provisional Patent Application Ser. No. 62/385,954 filed Sep. 9, 2016, the contents of which application are hereby incorporated by reference in their entirety.

TECHNICAL FIELD

The present disclosure is directed towards retail, branded and foodservice yogurt as a prepared food for direct consumption, or as an ingredient in a food product, and to broaden the consumption of yogurt products to the growing, lactose intolerant, healthy focused, consumer base. More specifically, provided is a yogurt product prepared from high starch fruits.

BACKGROUND

Yogurt is one of the oldest fermented foods known to mankind. Its renewed popularity has increased over the last few years because of its low-calorie content, high protein value (especially in varieties of Greek yogurt) and its probiotic attributes, which are beneficial to gut health.

A typical milk based yogurt contains about 84% moisture, 2% fat, 7% protein and 7% carbohydrates (mainly lactose) and is characterized by its curd texture and lactic flora. However, more and more consumers are becoming lactose intolerant. Providing a healthy, lactose free yogurt or product would be greatly welcomed by such health-conscious consumers.

Existing non-dairy yogurt products are typically based on soybean meal. However, soy-based yogurt products can have a disagreeable taste, odor and/or color. Thus, for example, typical soybean milk has an unattractive appearance, is vastly different in flavor from cow's milk and is often found unpalatable by those accustomed to cow's milk. However, milk contains lactose (a dimer of glucose and galactose) and many people have lost the ability to digest this sugar. Known as lactose intolerance, it is a major reason consumers buy dairy free products.

Another reason consumers opt for non-dairy products results from cow's milk protein allergy (CMPA), which is a common food allergy (or dairy allergy). Individuals with CMPA experience digestive problems (such as diarrhea, vomiting, constipation and reflux), skin problems (such as hives and eczema), respiratory symptoms (such as persistent cough and wheezing) and other more general allergy symptoms (for example, tiredness, problems sleeping, etc.) have been documented to occur.

Beyond an objectionable taste, odor, color, and/or texture, substituting soy for dairy can have additional drawbacks. For example, soybean meal, the other protein used to make yogurt, contains compounds (isoflavones) that mimic estrogen and lower testosterone levels. These plant estrogens (phytoestrogens) cannot be wholly removed from any variety of soy food. The only way to remove most of the phytoestrogens is by "alcohol extraction." The presence of these compounds has driven some people away from foods made with soy proteins. Soybeans are also known to cause flatulence when metabolized. Moreover, allergies to soybeans are becoming more and more common.

There is a need for non-dairy yogurt products that minimize or eliminate one or more of the disadvantages of soy-based yogurt products.

SUMMARY

In general terms, the present disclosure is directed to yogurt products and methods of making yogurt products that are substantially or entirely free of dairy and free of soy. In some examples the products are substantially or entirely free of dairy derivatives, such as lactose, casein, and whey protein.

As used herein, the terms "yogurt" and "yogurt product" encompass dairy yogurt, as well as imitations of dairy yogurt. Dairy yogurt is a semi-solid or liquid food prepared from animal milk fermented by added bacteria. Dairy yogurt also encompasses various styles of yogurt, including but not limited to, traditional style yogurt, Greek style yogurt, drinkable or yogurt. Imitations of dairy yogurt can be non-dairy (i.e., contain no dairy and no dairy derivative) or substantially non-dairy (i.e. contain small amounts of dairy or dairy derivatives, such as whey protein or casein, but are otherwise dairy free). An example of a non-dairy yogurt is a soy based yogurt.

As used herein, the term "green banana" encompasses bananas that are in any of ripeness Stages 1, 2, 3, or 4. The stages of banana ripeness are described in greater detail below. The term "green banana" further encompasses plantains that meet the criteria of bananas in ripeness Stages 1, 2, 3, or 4, as plantains are very similar in composition of starch and proteins to green bananas.

In accordance with certain examples of the yogurt products of the present disclosure, the bananas used to make the yogurt product are in Stage 1 or Stage 2 of ripeness. In other examples, the bananas used contain less than 1% sugar content.

In at least some examples, one or more attributes of yogurt products produced by the methods of the present disclosure, such as appearance, taste, smell, and/or texture is improved as compared with one or more existing non-dairy or substantially non-dairy yogurt products.

In accordance with certain aspects of the present disclosure, a method for the manufacture of non-dairy or substantially non-dairy yogurt from a high starch fruit is provided, the yogurt being at least substantially lactose-free, animal-fat-free and soy free. The high starch fruit can be selected from one or more of, e.g., bananas, plantains, mangos, figs, raisins and bread fruit; however, this list should not be deemed limiting.

In accordance with further aspects of the present disclosure, method is provided for the manufacture of non-dairy yogurt based on green banana flour, the yogurt being lactose-free, animal-fat-free and soy free.

In accordance with further aspects of the present disclosure, a non-dairy or substantially non-dairy yogurt is provided that contains resistant starch (RS). Green banana flour, for example, contains RS which has been shown to have provided benefits towards good gut health and may also have benefits relating to lowering triglycerides, improved glycemic index (GI) and helping to reduce or control blood sugar levels.

In accordance with further aspects of the present disclosure, methods of producing non-dairy or substantially non-dairy yogurt include fermentation and/or an enzymatic process to convert the starch in one or more high starch fruits to sugars. In some examples, yogurt is produced by fermenting and/or enzymatically processing green banana flour to produced sugars. The green banana flour can be prepared in any suitable way, such as by drying a puree of green banana. Puree of green banana, as used herein, refers to the material from peeled mashed green bananas.

BRIEF DESCRIPTION OF THE DRAWINGS

The FIGURE is a flow chart showing an example method of preparing a non-dairy yogurt product in accordance with the present disclosure.

DETAILED DESCRIPTION

The yogurt or product can be prepared using a process which converts the starch in the fruit to sugars and utilizes the proteins in the fruit as the only required source for the yogurt.

Seven stages have been described in the ripening of the banana. Stage 1 is when the banana is completely green and has no signs of yellow on the skin. Stage 2 starts to show some slight signs of yellow usually at the distal end of the banana. At the next three stages, the yellow continues from the distal end towards the proximal end (where the fruit attaches to the tree) of the fruit. At stage 6 of the ripening the banana is completely yellow. Stage 7 is when the banana starts to develop brown spots and finally turns completely brown.

As a banana ripens, the starch in its pulp converts to sugar. Thus, the starch present in the banana is being converted to sugars and the flavor changes from an earthy mild taste to the banana (isoamyl acetate) taste one normally associates with ripe bananas. During the ripening process, the granular starch found in green bananas is being converted to soluble starches and further to sugars.

The term "sugar" or "sugars" as used herein refers to both simple and complex sugars, such as mono, di, tri and oligosaccharides, unless otherwise specified.

Thus, for a given banana, each ripening stage can be correlated with its sugar content, which is defined herein as the percentage mass of sugars (sucrose, glucose, fructose) of the total mass of that banana's pulp. For purposes of this disclosure: a Stage 1 banana has a sugar content of 2% or less; a Stage 2 banana has a sugar content greater than 2% up to and including 5%; a Stage 3 banana has a sugar content greater than 5% up to and including 10%; a Stage 4 banana has a sugar content greater than 10% up to and including 25%; a Stage 5 banana has a sugar content greater than 25% up to and including 45%; a Stage 6 banana has a sugar content greater than 45% up to and including 65%; and a Stage 7 banana has a sugar content greater than 65%.

As used herein, green banana refers to bananas in stages 1, 2, 3, or 4 of the ripening process, as well as plantains having sugar content corresponding to that of any of ripeness Stages 1, 2, 3, and 4 defined herein, as plantains are very similar in composition of starch and proteins to green bananas. As used herein, green banana puree refers generally to puree made from bananas in stages 1, 2, 3 and/or 4 of the ripening process, or plantains having sugar content corresponding to that of any of ripeness Stages 1, 2, 3, and 4, unless otherwise specified. As used herein, green banana flour refers generally to flour made from bananas in stages 1, 2, 3, and/or 4 of the ripening process, or plantains having sugar content corresponding to that of any of ripeness Stages 1, 2, 3, and 4, unless otherwise specified. As used herein, banana flour refers to flour made from bananas in stages 5-7 of the ripening process, and banana puree refers to puree made from bananas in stages 5-7 of the ripening process.

Green banana flour and banana flour can be prepared in a different ways. According to some examples, green banana flour is the resultant product of drying green banana puree, and banana flour is the resultant product of drying banana puree. With respect to at least green banana flour preparation, relatively low temperatures are required for the preparation of such a flour so as not to disrupt the structure of the starch and protein native to the green banana.

Referring to the FIGURE, an example method 100 for the manufacture of at least substantially non-dairy yogurt based on green banana flour includes a step 102 of dispersing a pre-gelatinized green banana flour and/or banana flour in water, followed by an optional step 104 of adding sufficient enzyme to convert the starch portion of the green banana flour and/or banana flour to sugars, followed by a step 106 of heating the mixture of pre-gelatinized green banana flour and/or banana flour, water, and enzyme sufficiently to stop the enzyme activity, followed by a step 108 of adding tricalcium phosphate and a yogurt culture to the mixture to lower the pH to a desired level, followed by a step 110 of cooling the to stop the incubation.

In some examples, the heating step 106 brings the mixture to a temperature in a range from 70° C. to 100° C. In some examples the heating step 106 brings the mixture to a temperature in a range from 80° C. to 95° C. In some examples, the heating step 106 brings the mixture to a temperature of or about 90° C. In some examples, the heating step 106 also provides pasteurization of the product. In some examples, one or more additional pasteurization steps can be incorporated into the process 100.

In some examples, in the pH lowering step 108, the mixture is held at a temperature in a range from 30° C. to 60° C. In some examples, the mixture is held in the pH lowering step 108 at a temperature in a range from 35° C. to 50° C. In still further examples, the mixture is held in the pH lowering step 108 at a temperature of or about 43° C.

In some examples, the pH lowering step 108 brings the mixture to a pH in a range from 2.5 to 6.5. In some examples, the pH lowering step 108 brings the mixture to a pH in a range from 3.5 to 5.5. In still further examples, in the pH lowering step 108, the mixture is brought to a pH of or about 4.5.

In some examples, the cooling step 110 brings the mixture to a temperature in a range from 1° C. to 15° C. In some examples the cooling step 110 brings the mixture to a temperature in a range from 2° C. to 10° C. In some examples, the cooling step 110 brings the mixture to a temperature of or about 4° C.

Conversion of the starchy material in the enzyme adding step 104 of the process 100 can be accomplished by any enzyme capable of hydrolyzing the starch chains. Non-limiting examples of these enzymes include alpha amylase, beta amylase, pullulanase and glucoamylase. In some examples the enzymes used are alpha amylase and glucoamylase. In other examples, the enzyme used is alpha amylase. It should be appreciated that the enzyme addition is optional. If a more starchy or less sweet final product is desired, for example, the enzyme addition step can be skipped, or the amount of enzyme added can be reduced, and/or the added enzyme can be deactivated after a shorter period of time. In addition, the amount and/or type of enzyme used, and/or the amount of time the enzyme is allowed to convert starches before being deactivated can depend on the ripeness level of the banana flour or green banana flour.

Optionally, in a step 112, additional flour can be added to the mixture after conversion of the starch portion of the flour with the enzyme or at another point during the process. Such additional flours include, e.g., wheat flour, rice flour, banana flour, plantain flour, soybean flour, almond flour, buckwheat flour, flaxseed flour, oat flour, potato flour, barley flour and amaranth flour. Further optionally, additional green banana puree or banana puree may be added to the mixture after the enzyme conversion has been completed and the enzyme activity has been stopped or at another time in the manufacturing process. Adding green banana flour or green banana puree after the starch conversion step can, e.g., beneficially increase the amount of RS in the final product.

In at least some examples, the enzyme conversion of the starches in step 104 of the process 100 occurs more readily when the mixture includes an already gelatinized (i.e., "pre-gelatinized") green banana flour, rather than a native green banana flour. Pre-gelatinized green banana flour is a native green banana flour that is treated partially or wholly to disrupt the granular structure of the starch portion of the flour. Methods for producing such pre-gelatinized green banana flour include, for example, spray drying, drum drying, or cooking the native flour followed by freeze drying, ball milling and alkali induced gelatinization, followed by precipitation. The pre-gelatinized flour can also be prepared in a liquid form and used for formulation without preparing a dry product. In some examples of the process 100, using pre-gelatinized green banana flour in the step 102 can provide for a longer shelf life than alternative forms of green banana flour.

In some examples, a pre-gelatinized green banana flour used in the process 100 is NuBana™ P500 green banana flour available from International Agricultural Group (106 LangTree Village Drive, Suite 301, Mooresville, N.C. 28117).

In some examples, green banana flour is used to make the pre-gelatinized flour. Green banana flour has less banana taste and high levels of granular starch. In some examples, the green banana flour is made from green bananas in stages 1 to 4 or 1 to 3 of the ripening process. In some examples, the green banana flour is made from green bananas in stages 1 or 2 of the ripening process. In some examples pre-gelatinized banana flour is prepared by drum drying green banana flour. Without being bound to a theory, it is believed that the drum drying process can denature the naturally occurring enzymes in the fruit and stop the ripening process. Conditions surrounding the gelatinization process, such as the pH of the green banana material, the temperature of the drum and/or the retention time on the drum can yield various different levels of pre-gelatinization.

Further ingredients may be added to the yogurt products of the present disclosure. Such ingredients include, but are not limited to, fatty material to enhance mouthfeel or for other aesthetic properties; sugars such as sucrose, fructose, glucose or non-caloric sugar substitutes; natural or artificial flavors; whole fruits, fruit puree or fruit juice; supplements such as preservatives, coloring agents, vitamins, herbs and spices, salt and emulsifiers. Addition of supplemental amounts of proteins could also be added, though it should be appreciated that the source of the protein can, in some examples, can result in a final yogurt product this not dairy free and/or not soy free.

Such additional ingredient or ingredients can be added to the yogurt product at any point in the process, depending on the desired results. In some examples, the additional ingredients can be added at the very end of the process, i.e. after the step 110. The additional ingredient or ingredients can be mixed in by any suitable method including but not limited to, stirring, homogenization, extrusion, and so forth.

EXPERIMENTAL EXAMPLES

In the following example experiment descriptions, all masses are in grams, temperatures are in ° C., and time is in hours unless otherwise noted. Ratios given in parts are by mass.

Formulation Experiments:

Example 1

Production of Non-Dairy Yogurt Product Containing Banana Flour

In a 500 mL sauce pan 6 parts of NuBana™ P500 green banana flour, 10 parts glucose syrup and 83.56 parts of water were added. The ingredients were then whisked until smooth and then heated on a stove until the slurry reached 85° C. Once at temperature 0.2 parts of tricalcium phosphate was added and mixing until dissolved. The mixture was transferred to a 500 mL glass beaker and 20 parts of the pasteurized banana puree was added and mixed thoroughly. The mixture was cooled to 43° C. by placing the beaker in a water bath controlled at 43° C. When the temperature was at the set point 0.24 parts of the yogurt culture (Yo-Fast 88) was added the mixture was held at 43° C. until the yogurt's pH was at or below 4.5. This typically took 3-6 hours. When the pH was at the desired point, the mixture was cooled to 4° C. to stop the incubation and then packaged for refrigeration and further testing. Any flavors or additional sugar was added at just prior to packaging.

Example 2

Production of Non-Dairy Yogurt Product Containing Enzyme Converted Banana Flour

In a 500 mL saucepan 7.74 parts of NuBana™ P500 green banana flour, 10 parts glucose syrup and 78.01 part of water were added. A total of 0.024 parts of alpha amylase was added and all the ingredients were then whisked until smooth. The mixture was stirred for an additional 20 minutes without heating. After stirring for 20 minutes the mixture was heated on a stove until the temperature was at a uniform 90° C. to deactivate the enzyme. Once the temperature reached 90° C. it was held for 5 minutes and then removed from the heat and quickly cooled by placing the pan into a bowl of cold water to lower the temperature to less than 40° C. An additional 3.8 parts of NuBana™ green banana flour was added and whisked into the mixture until and the saucepan was placed back on the stove and heated until the slurry reached 85° C. Once at temperature 0.2 parts of tricalcium phosphate was added and mixing until dissolved. The mixture was transferred to a 500 mL glass beaker and 20 parts of the pasteurized banana puree was added and mixed thoroughly. The mixture was cooled to 43° C. by placing the beaker in a water bath controlled at 43° C. When the temperature was at the set point 0.24 parts of the yogurt culture (Yo-Fast 88) was added and the mixture was held at 43° C. until the yogurt's pH was at or below 4.5. This typically took 3-6 hours. When the pH was at the desired point, the mixture was cooled to 4° C. to stop the incubation and then packaged for refrigeration and further testing. Any desired flavors or additional sugar was added at just prior to packaging.

Example 2

Materials

| Supplier | Ingredients |
|---|---|
| International Agriculture Group - 106 LangTree Village Drive, Suite 301, Mooresville, North Carolina 28117 | NuBana ™ P500 green banana flour |
| Enzyme Development Corporation - 505 Eighth Avenue, 15th Floor, New York, NY 10018-6505 | Alpha amylase |
| Dawn Food Products (Canada) LTD. - 20195 South Diamond Lake Rd., Suite 200, Rogers, MN 55374 | Glucose Syrup |
| Natural Enrichment Industries - 1002 S Park St, Sesser, IL 62884 | Tricalcium phosphate |
| Chiquita - 1855 Griffin Road, Suite C-436 Fort Lauderdale FL 33004-2275 | Banana puree |
| Chr Hansen - Boege Alle 10-12, 2970 Hoersholm, Denmark | Yo-Fast 88 culture |

The following table provides non-dairy yogurt product formulations for each of four non-dairy yogurt samples prepared according to methods of the present disclosure.

TABLE 1

Formulation parameters

| Ingredients | Sample 1 % (by mass) | Sample 2 % (by mass) | Sample 3 % (by mass) | Sample 4 % (by mass) |
|---|---|---|---|---|
| Water | 83.56 | 88.01 | 73.56 | 78.01 |
| NuBana ™ P500 green banana flour | 6 | 11.54 | 6 | 11.54 |
| Alpha amylase | — | 0.024 | — | 0.024 |
| Tricalcium phosphate | 0.2 | 0.19 | 0.2 | 0.19 |
| Glucose syrup | 10 | — | — | 10 |
| Banana puree | — | — | 20 | — |
| Yo-Fast 88 culture | 0.24 | 0.23 | 0.24 | 0.23 |

The following table provides fermentation parameters for each of the four samples identified in Table 1.

TABLE 2

Fermentation parameters

| Ingredients | Sample 1 | Sample 2 | Sample 3 | Sample 4 |
|---|---|---|---|---|
| Final pH | 4.34 | 4.47 | 4.42 | 4.39 |
| Brix | 11 | 8 | 7 | 10 |
| Fermentation time (hours) | 3 | 5 | 3 | 5 |

Sensory Evaluation Experiment:

Five non-dairy yogurt samples were prepared and used in conducting a sensory evaluation experiment. Samples 1 through 4 are described above in Tables 1 and 2, and sample 5 was a commercially available non-dairy soy yogurt with blueberry flavor. Samples 1 through 4 were the test samples, with Sample 5 being the control sample. Samples 1 and 3 were made using the procedure in the formulation Example 1 described above. Samples 2 and 4 were made using the procedure in formulation Example 2 described above. Of the test samples (Samples 1-4) blueberry flavor was added only to Sample 4.

Twelve panelists were recruited for sensory evaluation. The color, flavor, texture, mouthfeel and overall acceptability were evaluated based on 6-point hedonic scale with 6 meaning "like very much"; and 1 meaning "dislike very much". Samples were presented to panelists in random order in a blind study.

According to the results of in-house sensory evaluation, Sample 4 had the highest mean score for all the sensory attributes, followed by Sample 3. Compared to the control sample, Sample 1 had higher mean scores in all the properties, and Sample 2 had better color and texture, with a lower score for flavor, mouthfeel and overall acceptability.

The mean score higher than 4 ("like slightly") indicates that the yogurt product is acceptable to panelists. According to the results in Table 3, Samples 3 and 4 were acceptable to panelists and more preferable than the control Sample 5.

TABLE 3

Sensory evaluation

| Sample ID | Color | Flavor | Texture | Mouthfeel | Overall acceptability |
|---|---|---|---|---|---|
| Sample 1 | 4 | 3.2 | 3.4 | 3.3 | 3.1 |
| Sample 2 | 3.6 | 2.7 | 3.3 | 3 | 2.8 |
| Sample 3 | 4.3 | 4.2 | 4.1 | 3.9 | 4.1 |
| Sample 4 | 4.5 | 5.3 | 4.8 | 4.9 | 5.1 |
| Sample 5 (control) | 3.1 | 2.9 | 3 | 3.1 | 3 |

TABLE 4

Ranking results

| Preference | Sample 1 | Sample 2 | Sample 3 | Sample 4 | Sample 5 (control) |
|---|---|---|---|---|---|
| $1^{st}$ choice | 0/12 | 0/12 | 0/12 | 11/12 | 1/12 |
| $2^{nd}$ choice | 0/12 | 0/12 | 7/12 | 1/12 | 4/12 |
| $3^{rd}$ choice | 7/12 | 1/12 | 3/12 | 0/12 | 1/12 |
| $4^{th}$ choice | 2/12 | 8/12 | 2/12 | 0/12 | 0/12 |
| $5^{th}$ choice | 3/12 | 3/12 | 0/12 | 0/12 | 6/12 |

The sensory panel rankings are shown in table 4 above. Eleven panelists (91.6%) liked the yogurt made with banana flour hydrolysate and sweetened with blueberry flavored (Sample 4) the most among all the yogurt product samples. The yogurt made with banana flour hydrolysate & banana puree (Sample 3) was ranked second with seven panelists (58% panelists) ranking it as second choice, three panelists ranking it as third choice, and two panelists ranked it as fourth choice.

Liquid Separation Experiment

Some of the Samples 1-5 identified above of non-dairy yogurt stored at refrigerated temperature (4° C.) for more than seven days formed a layer of liquid on top of the yogurt. The amount of liquid separated was measured by two different methods.

In Method 1 the liquid was separated by pouring off any liquid on the top of the yogurt and then weighing the remaining yogurt sample.

In Method 2 the yogurt sample was centrifuged and the liquid removed to determine the liquid separation percent.

Method 2 was conducted as follows: 20 g of yogurt from each of the fiber samples was placed into a 50 mL centrifuge tube and centrifuged at 200 RPM for 5 minutes at 4° C. using a Heraeus™ Megafuge™ 16R centrifuge (Available from Thermo Fisher Scientific, Germany). The liquid was then decanted from the centrifuge tube and the remaining yogurt was weighed. Liquid separation is calculated as shown below;

$$\text{Liquid separation (\%)} = \frac{W2}{W1} \times 100,$$

where W2 is the weight of the yogurt after any liquid that could be poured off was removed, and W1 is the weight of the yogurt before any separation occurred. The results as percent separation, for all five samples are shown in table 5, below.

Samples 4 and 5 had a slightly softer texture making it difficult to discern the liquid layer from the yogurt layer and virtually impossible to separate off the liquid using Method 1. A difference between these two samples can be seen when the samples were centrifuged. The results below show that the yogurt containing the enzyme-converted banana flour performed most like Sample 5. In addition, visual inspection of all five yogurt samples show that the formulations containing enzyme converted banana flour had the smoothest texture and the least amount of grittiness.

TABLE 5

Liquid separation

| Sample ID | Liquid separation[1] (%) | Liquid separation[2] (%) |
|---|---|---|
| Sample 1 | 2.33 | 15.4 |
| Sample 2 | 0.59 | 5.7 |
| Sample 3 | 1.28 | 5.7 |
| Sample 4 | ND[a] | 3.4 |
| Sample 5 (control) | ND[a] | 1.6 |

Table 5 Key:
[a] not determinable
[1] determined using method 1
[2] determined using method 2

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A yogurt product composition comprising at least 3% by mass of banana flour and/or plantain flour, the composition being acid fermented to a pH that is no greater than 6.5;
    wherein the yogurt product composition contains no dairy and no soy; and
    wherein the banana flour and/or plantain flour is formed from a dried green banana and/or plantain puree made from peeled mashed green bananas and/or plantain and is the only source of protein in the yogurt product composition and the only source of banana and/or plantain in the yogurt product composition.

2. The yogurt product composition of claim 1, wherein the composition is acid fermented to a pH that is no greater than 5.5.

3. The yogurt product composition of claim 1, wherein the composition is acid fermented to a pH that is less than 4.5.

4. The yogurt product composition of claim 1, wherein the banana flour is made from green bananas in Stage 1 or Stage 2 of ripeness.

5. The yogurt product composition of claim 1, wherein the composition comprises at least 6% by mass of green banana flour and/or plantain flour.

6. The yogurt product composition of claim 1, wherein the banana flour and the plantain flour are pre-gelatinized.

7. The yogurt product composition of claim 1, wherein the banana flour and/or plantain flour includes resistant starch.

8. The yogurt product composition of claim 1, wherein at least some starch from the banana flour/and or the plantain flour has been converted to sugar by an enzyme added to the composition.

9. The yogurt product composition of claim 8, wherein the enzyme is chosen from the group consisting of alpha amylase, beta amylase, pullulanase and glucoamylase.

10. The yogurt product composition of claim 8, wherein the enzyme is alpha amylase.

11. A method of preparing a non-dairy and non-soy yogurt product containing at least 3% by mass of banana flour and/or plantain flour, the method comprising the steps of:
    dispersing the banana flour and/or plantain flour formed from a dried green banana and/or plantain puree made from peeled mashed green bananas and/or plantain in water to form a first mixture, wherein the banana flour and/or plantain flour is the only source of protein in the first mixture and the only source of banana and/or plantain in the first mixture;
    adding an enzyme to the first mixture to convert starch in the banana flour and/or plantain flour to sugar to form a second mixture;
    heating the second mixture to a first predefined temperature to stop enzyme conversion and form a third mixture;
    adding a yogurt culture to the third mixture to form a fourth mixture;
    holding the fourth mixture at a second predefined temperature until the pH is less than 6.5 to form a fifth mixture; and
    cooling the fifth mixture to a third predefined temperature.

12. The method of claim 11, wherein the banana flour and/or the plantain flour are pre-gelatinized.

13. The method of claim 11, wherein the dispersing includes dispersing green banana flour in the water to form the first mixture.

14. The method of claim 13, wherein the green banana flour is made from green bananas in Stage 1 or Stage 2 of ripeness.

15. The method of claim 11, further comprising adding banana puree, green banana puree, and/or plantain puree to the third mixture, the fourth mixture, and/or the fifth mixture.

16. The method of claim 11, further comprising adding banana flour, green banana flour, and/or plantain flour to the third mixture, the fourth mixture, and/or the fifth mixture.

17. The method of claim 11, wherein the first temperature is between 80° C. and 95° C., wherein the second temperature is between 35° C. and 50° C., wherein the third temperature is between 1° C. and 10° C., and wherein the adding the yogurt culture to form the fourth mixture further comprises adding tricalcium phosphate to the third mixture.

18. A method of preparing a non-dairy and non-soy yogurt product containing at least 3% by mass of banana flour and/or plantain flour as the only source of protein in the yogurt product and the only source of banana and/or plantain in the yogurt product, the method comprising the steps of:
- dispersing the banana flour and/or plantain flour formed from a dried green banana and/or plantain puree made from peeled mashed green bananas and/or plantain in water to form a first mixture;
- adding a yogurt culture to the first mixture to form a second mixture;
- holding the second mixture between 35° C. and 50° C. until the pH is less than 6.5 to form a third mixture; and
- cooling the third mixture to a temperature between 1° C. and 10° C.

19. The yogurt product composition of claim 1, wherein the banana flour is made from green bananas having less than 2% sugar content.

\* \* \* \* \*